United States Patent
Jeong et al.

(10) Patent No.: US 8,359,198 B2
(45) Date of Patent: Jan. 22, 2013

(54) PRE-PROCESSING AND SPEECH CODEC ENCODING OF RING-BACK AUDIO SIGNALS TRANSMITTED OVER A COMMUNICATION NETWORK TO A SUBSCRIBER TERMINAL

(75) Inventors: Jae Woong Jeong, Seoul (KR); Seop Hyeong Park, Seoul (KR); Jong Kyu Ryu, Seoul (KR)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 13/426,411

(22) Filed: Mar. 21, 2012

(65) Prior Publication Data

US 2012/0179459 A1 Jul. 12, 2012

Related U.S. Application Data

(63) Continuation of application No. 12/160,090, filed as application No. PCT/KR2007/000115 on Jan. 8, 2007, now Pat. No. 8,145,479.

(30) Foreign Application Priority Data

Jan. 6, 2006 (KR) .................. 10-2006-0001901
Jan. 6, 2006 (KR) .................. 10-2006-0001902

(51) Int. Cl.
*G10L 21/02* (2006.01)
*G10L 11/02* (2006.01)

(52) U.S. Cl. ....................... 704/227; 704/233

(58) Field of Classification Search .................. None
See application file for complete search history.

(56) References Cited

U.S. PATENT DOCUMENTS

| | | | |
|---|---|---|---|
| 6,424,938 B1 * | 7/2002 | Johansson et al. | 704/216 |
| 6,718,298 B1 * | 4/2004 | Judge | 704/215 |
| 6,766,292 B1 | 7/2004 | Chandran et al. | |
| 6,898,566 B1 | 5/2005 | Benyassine et al. | |
| 7,159,233 B2 * | 1/2007 | Son et al. | 725/86 |
| 7,505,594 B2 * | 3/2009 | Mauro | 380/261 |
| 7,509,149 B2 * | 3/2009 | Shim et al. | 455/567 |
| 7,765,302 B2 * | 7/2010 | Whynot et al. | 709/227 |

(Continued)

FOREIGN PATENT DOCUMENTS

| | | |
|---|---|---|
| EP | 1199710 | 4/2002 |
| JP | 04-024693 | * 1/1992 |

(Continued)

OTHER PUBLICATIONS

ETSI TS 126 094 V4.0.0. "Universal Mobile Telecommunications System (UMTS): Mandatory Speech Codec speech processig functions AMR speech codec; Voice Activity Detector (VAD)", Mar. 2001.*

(Continued)

*Primary Examiner* — Talivaldis Ivars Smits
(74) *Attorney, Agent, or Firm* — Stoel Rives LLP

(57) ABSTRACT

A method of pre-processing an audio signal transmitted to a user terminal via a communication network and an apparatus using the method are provided. The method of pre-processing the audio signal may prevent deterioration of a sound quality of the audio signal transmitted to the user terminal by pre-processing the audio signal, and by enabling a codec module, encoding the audio signal, to determine the audio signal as a speech signal. The method of pre-processing may include separating the audio signal into channels, measuring the channel energy for each of the channels, selecting a specific channel energy, and amplifying the specific channel energy. The method may include encoding an audio signal using a speech codec and/or decoding an encoded audio signal using the speech codec.

21 Claims, 7 Drawing Sheets

U.S. PATENT DOCUMENTS

| | | | |
|---|---|---|---|
| 7,890,142 B2 * | 2/2011 | Mori | 455/561 |
| 2008/0051068 A1 * | 2/2008 | Frew et al. | 455/414.1 |

FOREIGN PATENT DOCUMENTS

| | | | |
|---|---|---|---|
| JP | 05323996 | | 7/1993 |
| JP | 10116097 | | 6/1998 |
| JP | 11004481 | | 6/1999 |
| JP | 2000047697 | | 2/2000 |
| JP | 2001051699 | | 2/2001 |
| JP | 2001216000 | | 8/2001 |
| JP | 2002156999 | | 5/2002 |
| JP | 2002258899 | | 9/2002 |
| JP | 2004177978 | | 6/2004 |
| JP | 2005316499 | | 11/2005 |
| KR | 1020050078524 | * | 5/2005 |
| KR | 1020050003225 | | 10/2005 |
| WO | WO 2004/079936 | * | 9/2004 |

OTHER PUBLICATIONS

Young Han, et al. "A preprocessing aproach to improving the quality of the music decoded by an EVRC codec", IEICE Trans. Commun, Dec. 2003.*

"Mandatory Speech Codec Speech Processing Functions," Universal Mobile Telecommunications System (UMTS), AMR Speech Codec; Voice Activity Detector (VAD); 3GPP TS 25.094 version 4.0.0 Release 4), pp. 1-26.

Nam, Y.H., et al., "A Preprocessing Approach to Improving the Quality of the Music Decoded by an EVRC Codec," IEICE Trans. Commun., Oct. 2003, pp. 3123-3125, vol. E86-B, No. 10.

* cited by examiner

PRE-PROCESSING AND SPEECH CODEC ENCODING OF RING-BACK AUDIO SIGNALS TRANSMITTED OVER A COMMUNICATION NETWORK TO A SUBSCRIBER TERMINAL

TECHNICAL FIELD

The present invention relates to a method of pre-processing an audio signal, transmitted to a user terminal via a communication network, for improving a quality of an output of the audio signal, and an apparatus using the method. More particularly, the present invention relates to a method of pre-processing an audio signal which can prevent deterioration of a sound quality of the audio signal by pre-processing the audio signal, transmitted to the user terminal via the communication network, and enabling a codec module, encoding the audio signal, to determine the audio signal as a speech signal, and an apparatus using the method.

BACKGROUND ART

A substitute ring back tone (RBT) providing service, that is one of multimedia services provided in a communication terminal, indicates a type of a service which transmits a predetermined audio signal, selected by a user of a subscriber's terminal to a caller terminal via a communication network when a call connection is requested from the caller terminal to the subscriber terminal, or when the call connection is requested from the subscriber terminal. As an example, when the subscriber terminal requests a called terminal, i.e. a subscriber terminal, for the call connection, the substitute RBT providing service transmits the audio signal 'I love you' to the subscriber terminal until a second user of the called terminal answers the call connection, such as by an off hook, and when the caller terminal requests the subscriber terminal for the call connection, the substitute RBT providing service transmits the audio signal 'I love you' to the caller terminal until the user of the subscriber terminal answers the call connection, such as by the off hook.

Generally, over communication networks, an audio signal is encoded using a speech codec, i.e. a linear predictive coding (LPC) based codec, instead of using an audio signal exclusive codec to encode the audio signal that is transmitted to the caller terminal or the called terminal. However, when the audio signal is encoded using the LPC based speech codec, the audio signal, generated to be played by the caller terminal or the subscriber terminal, is distorted in comparison to an original audio signal, and a comfort noise occurs during playing of the audio signal due to following reasons.

The speech signal is encoded to be transmitted into a speech codec at a low bit rate since a bandwidth of a speech channel used on a mobile communication network is comparatively narrower than a wired telephone having a bandwidth of approximately 64 kbps. Generally, speech codecs used in the mobile terminal are LPC-based compression methods. The LPC-based speech compression methods are efficient to compress a speech signal of a user in a low/intermediate bit rate since the LPC-based speech compression methods use an optimized model for a vocalization structure of the user, however, a deterioration of a sound quality may occur. The reasons are as follows:

(1) A formant frequency and a pitch period, i.e. most important parameters for a speech compression in the LPC based speech codec, may not be appropriately extracted in an audio signal. A pitch, a parameter corresponding to a fundamental frequency, is generated by a periodical vibration of a vocal cord. In case of the speech signal, a pitch exists in frequency bands from approximately 50 Hz to 500 Hz. Conversely, in case of the audio signal, a pitch may exist in a wider frequency band than the speech signal. Also, a single pitch exists in the speech signal. However, a number of pitches may exist in the audio signal.

(2) Spectra of the audio signal are comparatively complex when compared to spectra of the speech signal. In the case of the speech signal having simple spectra, remaining signals after extracting a parameter may be comparatively fully modeled. This is opposite from the audio signal.

(3) Using a voice activity detection (VAD) and a discontinuous transmission (DTX) in the LPC based speech codec may be one of the reasons. When the user communicates on a terminal, the DTX is used in an interval without speech signals so that speech signals are not transmitted since, according to statistics, no more than 50% of an entire calling time during an actual calling time are speech signals being transmitted/received. Subsequently, an efficiency of a frequency can be improved since a power consumption can be reduced in the subscriber terminal, and a level of an overall interference can be reduced in an air interface. Operation of the DTX is determined depending on the VAD.

To describe operations of the DTX and the VAD, the VAD analyzes at least one parameter with respect to the audio signal extracted from the speech codec, determines whether the audio signal is a speech interval or a speechless interval with respect to the at least one parameter, 1) as a result of the determination, when the audio signal is the speech interval, the DTX transmits the extracted at least one parameter to a demodulator in a receiver, and the subscriber terminal plays the audio signal based on the parameter.

Also, 2) as a result of the determination, when the audio signal is the speechless interval, the DTX generates a minimum parameter to transmit to the demodulator in the receiver, and the subscriber terminal plays a comfort noise according to the parameter. As described above, when the speech codec determines a normal audio signal as a speechless interval, the subscriber terminal may play the audio signal, transmitted to a RBT interval, as the comfort noise. Even when a number of mobile communication service providers are providing the substitute RBT providing service, a corresponding audio signal is inaudible, or is distorted when transmitted to the subscriber terminal due to a deterioration of the sound quality in the substitute RBT play interval.

In order to prevent a cut off phenomenon, occurring in the receiver by determining the audio signal as the speechless signal or playing the comfort noise instead of the audio signal, there are two methods as follows: 1) changing a codec of a base station and a terminal, and 2) transmitting the audio signal via a data network. However, the two methods have problems in that the two methods may bring a change to a great number of present systems, which are already built, and costs may be increased.

Thus, in all applied examples, in a predetermined audio signal transmitted via the communication network, including the example of the transmitting the substitute RBT to the subscriber terminal, a new method enabling a speech codec to determine an interval, which is being determined as a speechless interval in a conventional art, as a speech interval when encoding a specific audio signal via the communication network is required.

DISCLOSURE OF INVENTION

Technical Goals

The present invention provides a method of pre-processing an audio signal via a communication network which can improve a quality of an audio signal, transmitted to a user terminal, by increasing a probability of determining a frame of the audio signal as a speech interval in a speech codec via the communication network when transmitting the audio signal such as a substitute RBT to a user terminal via the communication network, and an apparatus using the method.

The present invention also provides a method of pre-processing an audio signal via a communication network which can provide a substitute RBT having an enhanced sound quality by pre-processing an audio signal to not determine the audio signal as a speechless interval in a speech codec via a communication network when transmitting an audio signal such as the substitute RBT to a user terminal via the communication network, and an apparatus using the method.

Technical Solutions

According to an aspect of the present invention, there is provided a method of pre-processing an audio signal transmitted to a user terminal via a communication network including: encoding the audio signal using a speech codec; and decoding the encoded audio signal using the speech codec, wherein a codec module, transmitting the decoded audio signal to the user terminal via the communication network, comprises determining whether a speech interval or a speechless interval with respect to at least one frame is included in the audio signal; and transmitting at least one parameter with respect to the at least one frame as a result of the determination.

According to an aspect of the present invention, there is provided an apparatus of pre-processing an audio signal transmitted to a user terminal via a communication network including: a speech codec encoding the audio signal and decoding the encoded audio signal, wherein a codec module transmitting the decoded audio signal to the user terminal via the communication network comprises a voice activity detection (VAD) module determining whether a speech interval or a speechless interval with respect to at least one frame is included in the audio signal; and a discontinuous activity detection module transmitting at least one parameter with respect to the at least one frame as a result of the determination.

According to another aspect of the present invention, there is provided method of pre-processing an audio signal transmitted to a user terminal via a communication network including: separating an audio signal into at least one channel; measuring a channel energy of the at least one channel, and selecting a specific channel energy from the channel energy; and amplifying the specific channel energy.

According to still another aspect of the present invention, there is provided method of pre-processing an audio signal transmitted to a user terminal via a communication network including: separating an audio signal into at least one channel; measuring a channel energy of the at least one channel, and selecting a specific channel energy from the channel energy; and decreasing the channel energy of the at least one channel except a channel having the specific channel energy.

BEST MODE FOR CARRYING OUT THE INVENTION

Hereinafter, a method of pre-processing an audio signal for improving an output of the audio signal, transmitted to a subscriber terminal via a communication network according to the present invention, and an apparatus using the method will be described in detail by referring to the attached drawings.

A terminal in the specification may be any one of a public switched telephone network (PSTN) terminal, a voice over Internet protocol (VoIP) terminal, a session initiation protocol (SIP) terminal, a media gateway control (Megaco) terminal, a personal digital assistant (PDA), a mobile phone, a personal communication service (PCS) phone, a hand-held personal computer (PC), a Code Division Multiple Access (CDMA)-2000 (1x, 3x) phone, a Wideband CDMA phone, a dual band/dual mode phone, a Global System for Mobile Communications (GSM) phone, a mobile broadband system (MBS) phone, and a satellite/terrestrial Digital Multimedia Broadcasting (DMB) phone.

Figure 1:
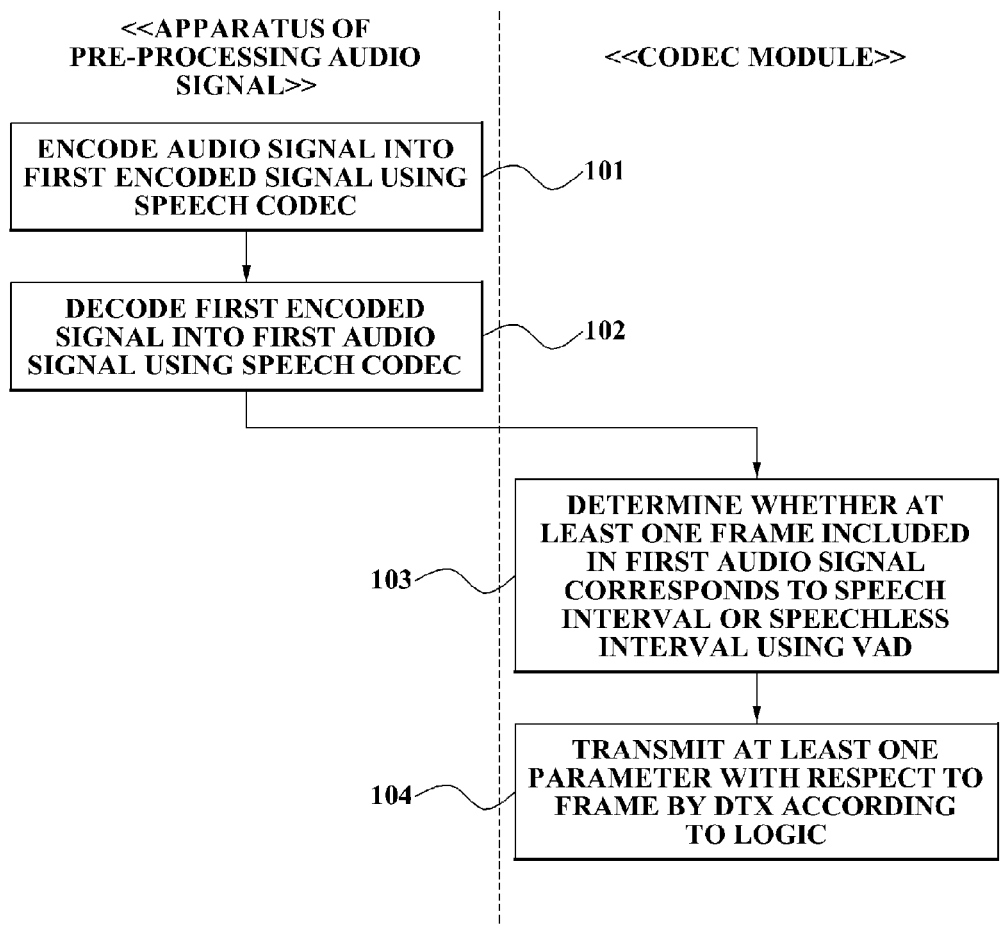
FIG. 1 is a flowchart illustrating a method of pre-processing an audio signal for improving an output of the audio signal according to an embodiment of the present invention.

FIG. 1 is a flowchart illustrating a method of pre-processing an audio signal for improving an output of the audio signal according to an embodiment of the present invention.

In operation 101, an apparatus of pre-processing the audio signal encodes the audio signal into a first encoded signal using a speech codec. According to an embodiment of the present invention, the apparatus of pre-processing the audio signal extracts at least one parameter with respect to the audio signal using the speech codec, and encodes the extracted at least one parameter into the first encoded signal. The speech codec may exclude a voice activity detection (VAD) and a discontinuous transmission (DTX).

In operation 102, the apparatus of pre-processing the audio signal decodes the first encoded signal into a first audio signal using the speech codec. According to an embodiment of the present invention, the apparatus of pre-processing the audio signal decodes the first encoded signal, including the at least one parameter, into the first audio signal using the speech codec.

According to the present invention, through operations 101 and 102, the at least one parameter, extracted from the audio signal using the speech codec, may have a similar feature to a speech signal.

In operation 103, a codec module, encoding the first audio signal to transmit the encoded first audio signal to a user terminal, determines whether at least one frame, included in the first audio signal, having been inputted using the VAD, corresponds to a speech interval or a speechless interval. The VAD may determine whether the at least one frame corresponds to the speech interval or the speechless interval based on the at least one parameter extracted from the codec module.

According to an embodiment of the present invention, the codec module may use any one of an adaptive multi-rate voice activity detector (AMR VAD) option 1 and an AMR VAD option 2.

In operation 104, the codec module transmits the at least one parameter with respect to the at least one frame to the user terminal, according to a logic predetermined by the DTX, by referring to a result of the determination.

Figure 2:
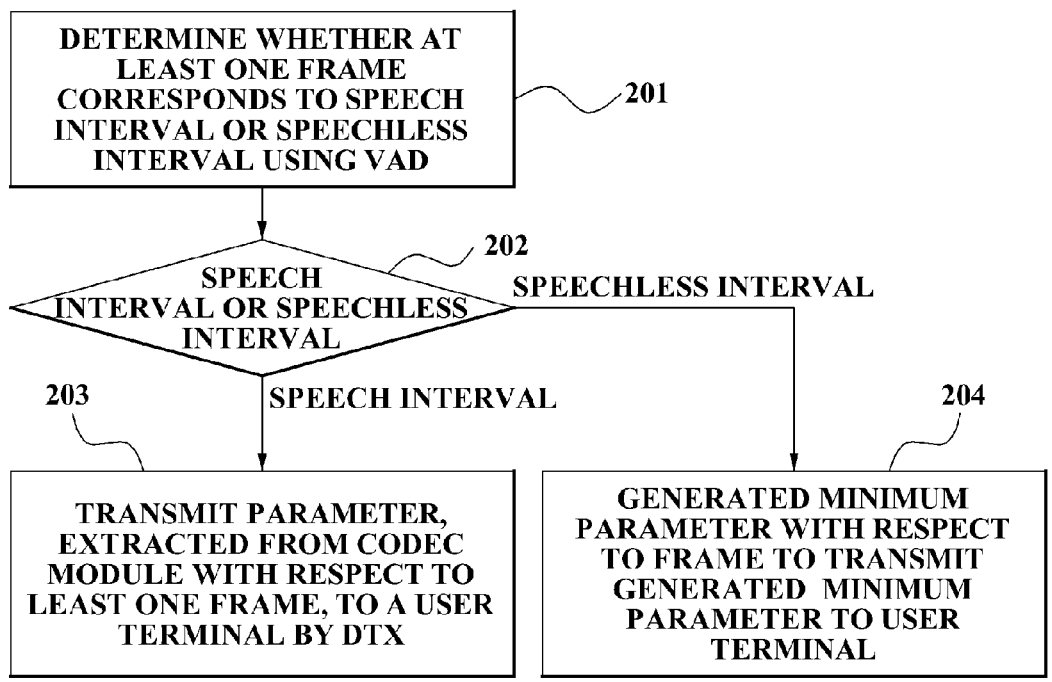
FIG. 2 is a flowchart illustrating a method of a discontinuous transmission (DTX) operation according to an embodiment of the present invention.

FIG. 2 is a flowchart illustrating a method of a DTX operation according to an embodiment of the present invention.

In operation 201, a codec module determines whether at least one frame, included in an inputted first audio signal, corresponds to a speech interval or a speechless interval using a VAD.

In operation 202, when the DTX determines the at least one frame corresponds to the speech interval, the DTX transmits a parameter, extracted from the codec module, to a user terminal with respect to the at least one frame in operation 203. Namely, the user terminal may play the audio signal according to the extracted parameter.

In operation 202, when the DTX determines the at least one frame corresponds to the speechless interval, the DTX generates a minimum parameter with respect to the at least one frame to transmit the generated minimum parameter to the user terminal in operation 204. Namely, the user terminal may output a comfort noise according to the minimum parameter.

Figure 3:
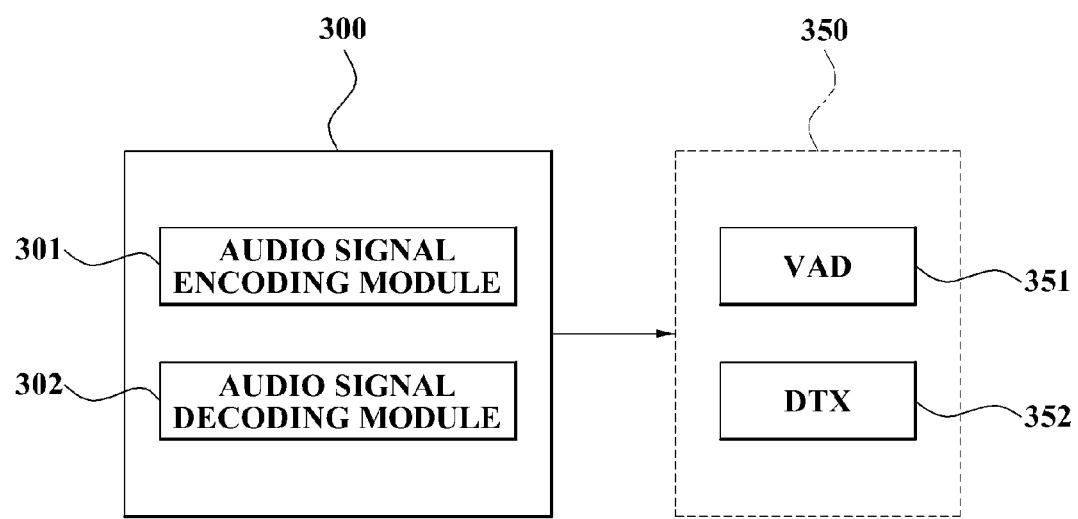
FIG. 3 is a block diagram illustrating an inner configuration of an apparatus of pre-processing an audio signal according to an embodiment of the present invention.

FIG. 3 is a block diagram illustrating an inner configuration of an apparatus 300 of pre-processing an audio signal according to an embodiment of the present invention.

As illustrated in FIG. 3, the apparatus 300 of pre-processing the audio signal according to the embodiment of the present invention includes an audio signal encoding module 301 and an audio signal decoding module 302.

The audio signal encoding module 301 encodes the audio signal into a first encoded signal using a speech codec. According to an embodiment of the present invention, the audio signal encoding module 301 extracts at least one parameter with respect to the audio signal using the speech codec, and encodes the extracted at least one parameter into the first encoded signal.

The audio signal decoded signal 302 decodes the first coded signal into a first audio signal using the speech codec. According to an embodiment of the present invention, the audio signal decoded signal 302 decodes the first encoded signal, including the at least one parameter, into the first audio signal using the speech codec.

A codec module 350, encoding the first audio signal to transmit the encoded first audio signal to a user terminal, includes a VAD 351 and DTX 352. According to an embodiment of the present invention, the codec module 350 may use any one of an adaptive multi-rate voice activity detector (AMR VAD) option 1 and an AMR VAD option 2.

The VAD 351 determines whether the at least one frame, included in the first audio signal, corresponds to the speech interval or a speechless interval.

The DTX 352 transmits the at least one parameter with respect to the at least one frame to the user terminal, according to a predetermined logic, by referring to a result of the determination.

According to an embodiment of the present invention, when the VAD 351 determines the at least one frame corresponds to the speech interval, the DTX 352 transmits the at least one parameter, extracted from the codec module, to the user terminal, and when the VAD 351 determines the at least one frame corresponds to the speechless interval, the DTX 352 generates a minimum parameter with respect to the at least one frame to transmit the generated minimum parameter to the user terminal.

Figure 4:
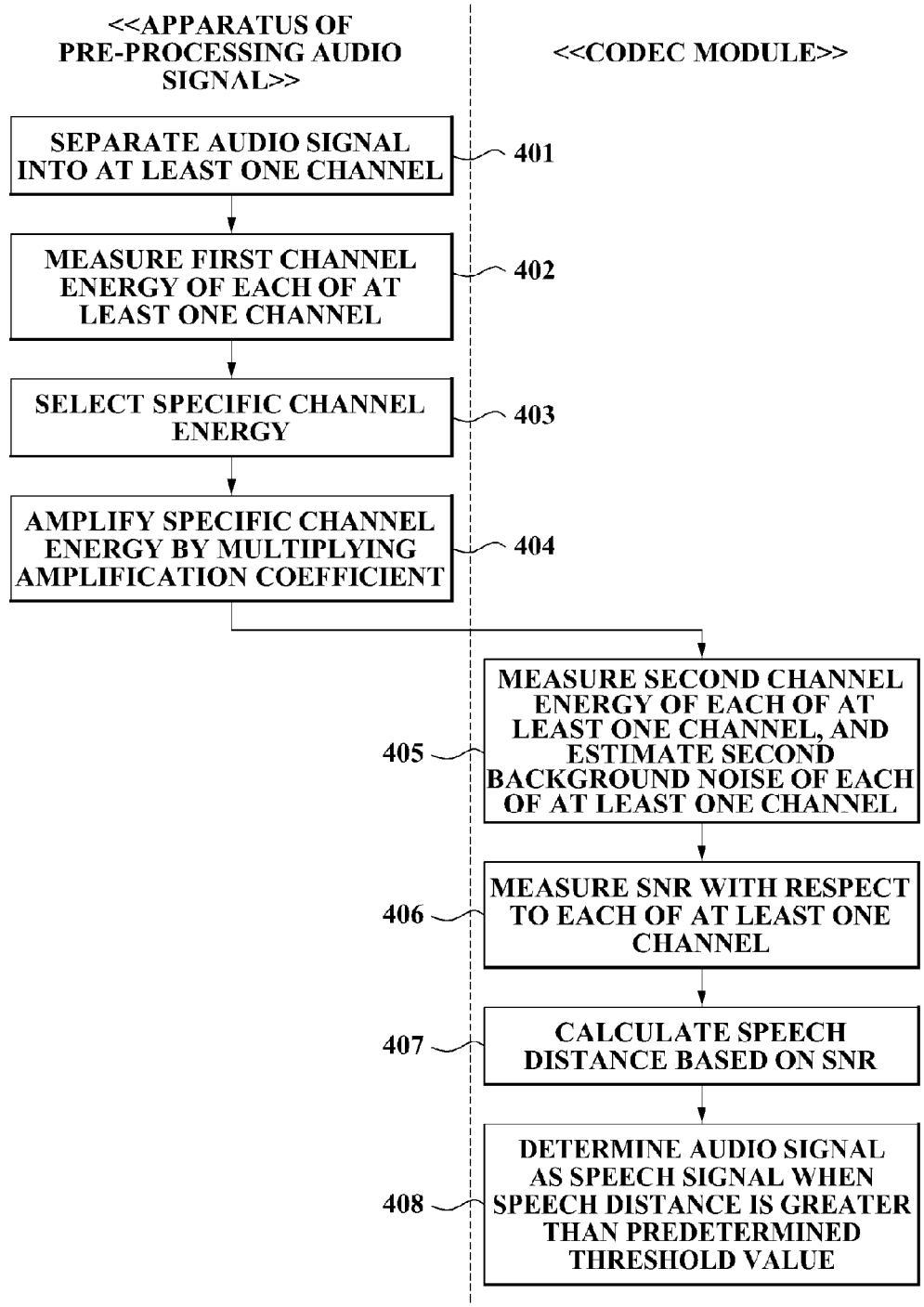
FIG. 4 is a flowchart illustrating a method of pre-processing an audio signal for improving an output of the audio signal according to another embodiment of the present invention.

FIG. 4 is a flowchart illustrating a method of pre-processing an audio signal for improving an output of the audio signal according to another embodiment of the present invention.

As illustrated in FIG. 4, the method of pre-processing an audio signal for improving the output of the audio signal according to the other embodiment of the present invention may include: (1) pre-processing with respect to an audio signal, and (2) encoding with respect to the pre-processed audio signal. The pre-processing with respect to the audio signal may include the following operations 401 through 404, and the encoding with respect to the pre-processed audio signal may include operations 405 through 408.

In operation 401, an apparatus of pre-processing the audio signal separates the audio signal into at least one channel.

According to another embodiment of the present invention, the apparatus of pre-processing the audio signal may separate the audio signal into the at least one channel for each frequency using a fast Fourier transform (FFT) algorithm. As an example, the apparatus of pre-processing the audio signal may separate the audio signal into sixteen channels using the FFT algorithm.

In operation 402, the apparatus of pre-processing the audio signal measures a first channel energy with respect to each of the at least one channel.

In operation 403, the apparatus of pre-processing the audio signal selects a specific channel energy from the measured first channel energies of the at least one channel. As an example, the apparatus of pre-processing the audio signal may select a channel having the greatest channel energy for the specific channel energy.

In operation 404, the apparatus of pre-processing the audio signal amplifies the specific channel energy by multiplying a predetermined amplification coefficient by the selected specific channel energy.

According to the present invention, when the apparatus of pre-processing the audio signal amplifies the specific channel energy, a probability that a codec module determines the audio signal as a speech signal by increasing a signal to noise ratio (SNR) may be increased.

According to another embodiment of the present invention, the apparatus of pre-processing the audio signal estimates a first background noise of each of the at least one channel, and may amplify the specific channel energy by selectively multiplying the predetermined amplification coefficient by the selected specific channel energy according to the estimated first background noise. As an example, when the estimated first background noise is less than a predetermined reference value, the specific channel energy is not amplified, and when the estimated first background noise is greater than the predetermined reference value, the specific channel energy is amplified.

The audio signal, having been pre-processed by undergoing the above describe operations 401 through 404, is inputted in the codec module according to the present invention, and may be encoded to be transmitted via a communication network. The encoding operation may include the following operations 405 through 408.

In operation 405, the codec module, encoding the audio signal, measures a second channel energy of each of the at least one channel with respect to the audio signal where the first specific channel energy is amplified, and estimates a second background noise with respect to each of at least one channel. Namely, the first channel energy is a channel energy that is estimated during the pre-processing with respect to the audio signal, and the second channel energy is a channel energy that is measured after the pre-processing with respect to the audio signal.

Also, the second background noise may be calculated as Equation 1, $$E_n(m+1,i) = \max\{E_{min}, 0.9E_n(m,i) + 0.1E_{ch}(m,i)\},$$
$$0 \leq i < N_c \quad \text{[Equation 1]}$$

$E_{ch}(m, i)$ indicates a channel energy of an $i^{th}$ channel in a frame 'm', and $E_n(m, i)$ indicates a background noise of an $i^{th}$ channel in the frame 'm', and $N_c$ indicates a number of channels.

According to another embodiment of the present invention, the codec module may use an AMR VAD option 2.

According to still another embodiment of the present invention, the codec module may compare average values of the second specific channel energy and the at least one second channel energy among the measured at least one second channel energy, and determine the audio signal as a sinusoidal wave when the second specific channel energy is greater than the average value. As known to those skilled in the art, when a predetermined signal is determined as the sinusoidal wave, a corresponding signal may be a signal having specific frequency which has especially strong power, subsequently a probability that the corresponding signal may be determined as a speech signal may be increased.

In order to calculate the second specific channel energy, the following Equation 2 may be used.

$$\phi(m) = 10\log_{10}\left(\frac{\max\{E_{ch}(m,i)\}}{\sum_{j=0}^{N_c-1} E_{ch}(m,j)/N_c}\right), 2 \leq i < N_c \quad \text{[Equation 2]}$$

The $E_{ch}(m, i)$ indicates a channel energy of an $i^{th}$ channel in an frame m, the $N_c$ indicates a number of channels, the $\sum_{j=0}^{N_c-1} E_{ch}(m, j)/N_c$ indicates an average value of the second channel energy.

Referring to Equation 1, when the apparatus of pre-processing the audio signal amplifies the first specific channel energy, a background noise of a channel having the first specific channel energy is amplified at the same time. According to the present invention, when the audio signal, having been pre-processed by undergoing operations 401 through 404, is already amplified with a channel energy of a channel having a specific channel energy, the codec module may compare average energy values of the second specific channel energy, calculated by referring to Equation 2, and other channels, and may determine the pre-processed audio signal as the sinusoidal wave.

Referring to Equation 1, when a specific energy is comparatively greater than an average channel energy of entire channel energies, $\Phi(m)$ increases, and when a specific energy is not greater than the average channel energy of the entire channel energies, $\Phi(m)$ decreases. As an example, the AMR VAD option 2 presumes a corresponding audio signal as a sinusoidal wave when $\Phi(m)$ is greater than ten, and when the sinusoidal wave is detected, the AMR VAD option 2 does not amplify a background noise.

Namely, an SNR of all the channels increases and a background noise may not be updated by amplifying a channel energy of a specific channel. Also, since the amplification is performed with respect to a channel energy having a specific channel energy, the SNR of all the channels, which is measured using the second channel energy and the second background noise with respect to the pre-processed audio signal, may be improved.

In operations 406, the codec module measures an SNR of each channel using the second channel energy and the second background noise with respect to the each channel. The SNR may be measured by Equation 3.

$$\sigma(i) = 10\log_{10}\left(\frac{E_{ch}(m, i)}{E_n(m, i)}\right), 0 \leq i < N_c \quad \text{[Equation 3]}$$

$E_{ch}(m, i)$ indicates a channel energy of an $i^{th}$ channel in an frame m, $E_n(m, i)$ indicates a background noise of the $i^{th}$ channel in the frame m, and $N_c$ indicates a number of channels, In operation 407, the codec module calculates a speech distance based on the SNR. According to the present invention, the speech distance may be calculated by summing up the SNRs with respect to the each channel.

In operation 408, the codec module determines the audio signal as the speech signal when the speech distance is greater than a predetermined threshold value, and encodes the audio signal.

According to the present invention, the speech distance, i.e. the summed SNRs with respect to the each channel, increases to be greater than the speech distance with respect to a previous audio signal due to the first specific channel energy, amplified during the pre-processing, therefore the codec module may determine the audio signal as the speech signal.

The predetermined threshold value measures a long term peak signal to noise ratio based on the SNR of each of the at least one channel, and is determined depending on the measured long term peak SNR. Namely, the predetermined threshold value is maintained to be in inverse proportion to the measured long term peak SNR, when the long term peak SNR is greater than the predetermined threshold value, the long term peak SNR is determined as a predetermined first threshold value, and when the long term peak SNR is less than the predetermined threshold value, the long term peak SNR is determined as a predetermined second threshold value. The first threshold value is greater than the second threshold value.

Figure 5:
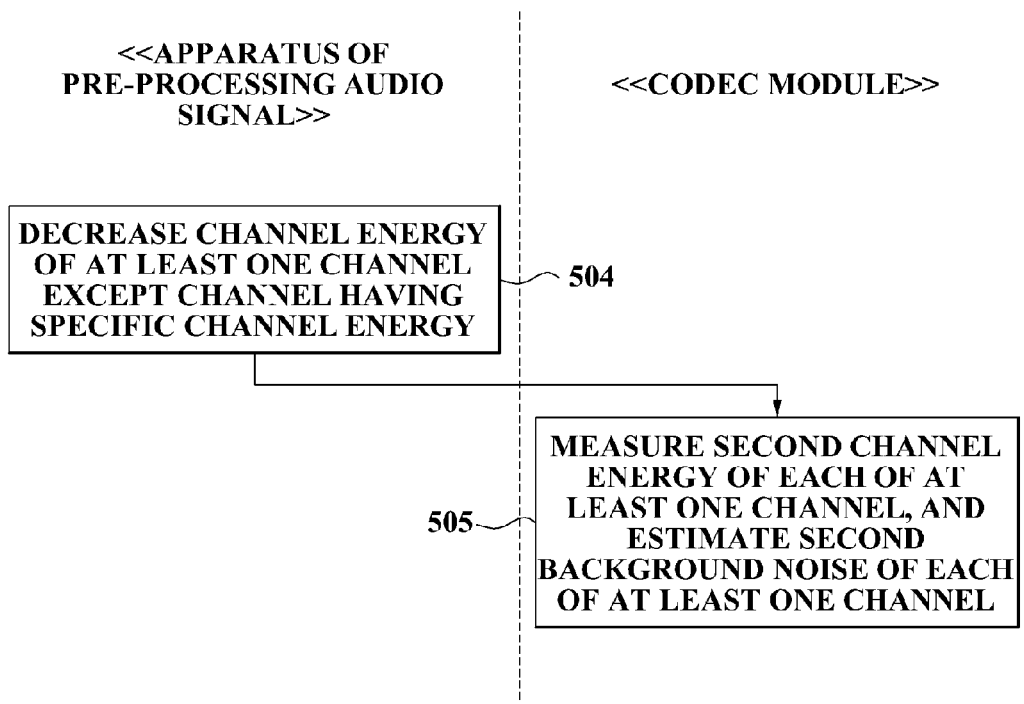
FIG. 5 is a flowchart illustrating a method of pre-processing an audio signal for improving an output of the audio signal according to still another embodiment of the present invention.

FIG. 5 is a flowchart illustrating a method of pre-processing an audio signal for improving an output of the audio signal according to still another embodiment of the present invention.

Descriptions regarding operations which would correspond to operations 501 through 503 and operations 505 through 508 will be omitted since the descriptions are the same as operations 401 through 403 and 406 through 408 of FIG. 4, and operations 504 and 505 will be described in the specification.

In operation 504, an apparatus of pre-processing an audio signal decreases a channel energy by multiplying a predetermined amplification coefficient by channel energies except a channel having a specific channel energy. Namely, when the apparatus of pre-processing the audio signal decreases the channel energy by multiplying the predetermined amplification coefficient by the channel energy except the channel having the specific channel energy, the specific channel energy becomes comparatively increased since the channel energies are decreased except the channel having the specific channel energy In operation 505, the codec module, encoding the audio signal, measures a second channel energy of each of channels with respect to the audio signal, having channel energies which are decreased except the channel having the specific channel energy, and estimates a second background noise of the each of the channels. Also, the second background noise may be estimated as Equation 1.

Figure 6:
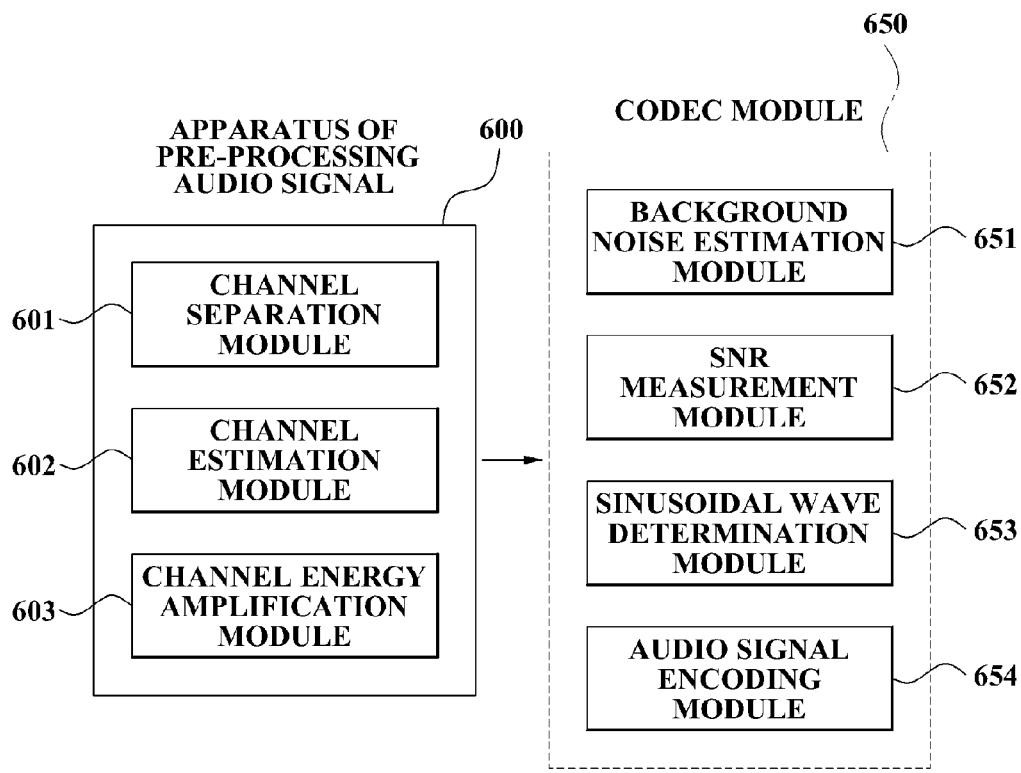
FIG. 6 is a block diagram illustrating an inner configuration of an apparatus of pre-processing an audio signal according to another embodiment of the present invention.

FIG. 6 is a block diagram illustrating an inner configuration of an apparatus 600 of pre-processing an audio signal according to another embodiment of the present invention.

As illustrated in FIG. 6, the apparatus 600 of pre-processing the audio signal includes a channel separation module 601, a channel estimation module 602, and a channel energy amplification module 603.

The channel separation module 601 separates the audio signal into at least one channel by analyzing a frequency of the audio signal. According to an embodiment of the present invention, the channel separation module 601 may analyze the frequency of the audio signal using a fast Fourier transform (FFT) algorithm, and separate the frequency of the audio signal into the at least one channel by the analysis.

The channel estimation module 602 estimates a first channel energy of each of the at least one channel.

The channel energy amplification module 603 selects a specific channel energy from the estimated first channel energy of each of the at least one channel, and amplifies the specific channel energy by multiplying a predetermined coefficient by the selected specific channel energy.

A codec module 650, encoding the audio signal, includes a background noise estimation module 651, an SNR measurement module 652, a sinusoidal wave determination module 653, and an audio signal encoding module 654.

The background noise estimation module 651 measures a second channel energy of each of the at least one channel with respect to the audio signal having specific channel energy amplified, and estimates a second background noise of each of the at least one channel. According to the present invention, the codec module 650 may use an AMR VAD option 2.

The SNR measurement module 652 measures an SNR of the each channel using the second channel energy and the second background noise with respect to each of the at least one channel. The sinusoidal wave determination module 653 compares average values of the second specific channel energy and the second channel energy among the measured at least one second channel energy, and determines the audio signal as the sinusoidal wave when the second specific channel energy is greater than the average value.

The audio signal encoding module 654 calculates a speech distance based on the SNR of each of the at least one channel, determines the audio signal as the speech signal when the speech distance is greater than a threshold value, and encodes the audio signal.

Also, according to the present invention, the audio signal encoding module 654 may calculate the speech distance by summing up the SNRs with respect to each of the at least one channel.

Also, according to another embodiment of the present invention, the threshold value measures a long term peak signal to noise ratio based on the SNR of each of the at least one channel, and is determined depending on the measured long term peak SNR.

Figure 7:
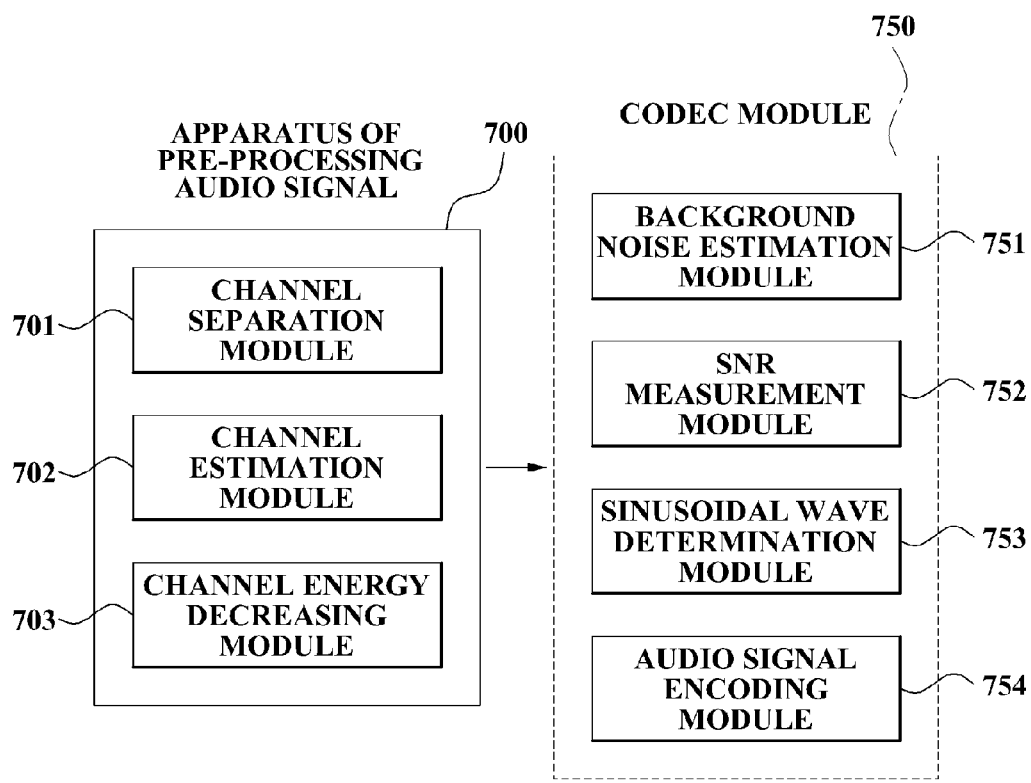
FIG. 7 is a block diagram illustrating an inner configuration of an apparatus of pre-processing an audio signal according to still another embodiment of the present invention.

FIG. 7 is a block diagram illustrating an inner configuration of an apparatus 700 of pre-processing an audio signal according to still another embodiment of the present invention.

As illustrated in FIG. 7, the apparatus 700 of pre-processing the audio signal includes a channel separation module 701, a channel estimation module 702, and a channel energy decreasing module 703.

The channel separation module 701 separates the audio signal into at least one channel by analyzing a frequency of the audio signal. According to an embodiment of the present invention, the channel separation module 701 may analyze the frequency of the audio signal using a fast Fourier transform (FFT) algorithm, and separate the frequency of the audio signal into the at least one channel by the analysis.

The channel estimation module 702 estimates a first channel energy of each of the at least one channel.

The channel energy decreasing module 703 selects a specific channel energy from the estimated first channel energy of each of the at least one channel, and decreases the channel energy by multiplying a predetermined coefficient by the channel energy except a channel having the selected specific channel energy.

A codec module 750, encoding the audio signal, includes a background noise estimation module 751, an SNR measurement module 752, a sinusoidal wave determination module 753, and an audio signal encoding module 754.

The background noise estimation module 751 measures a second channel energy of each of the at least one channel with respect to the audio signal having channel energy, except the channel having the selected specific channel energy, decreased, and estimates a second background noise of each of the at least one channel. According to the present invention, the codec module 750 may use an AMR VAD option 2.

The SNR measurement module 752 measures an SNR of the each channel using the second channel energy and the second background noise. The sinusoidal wave determination module 753 compares average values of the second specific channel energy and the second channel energy among the measured at least one second channel energy, and determines the audio signal as the sinusoidal wave when the second specific channel energy is greater than the average value.

The audio signal encoding module 654 calculates a speech distance based on the SNR of each of the at least one channel, determines the audio signal as the speech signal when the speech distance is greater than a threshold value, and encodes the audio signal.

Also, according to the present invention, the audio signal encoding module 654 may calculate the speech distance by summing up the SNRs with respect to each of the at least one channel.

Also, according to another embodiment of the present invention, the threshold value measures a long term peak signal to noise ratio based on the SNR of each of the at least one channel, and is determined depending on the measured long term peak SNR.

The method of pre-processing the audio signal for improving a quality of an output of the audio signal according to the above-described embodiment of the present invention may be recorded in computer-readable media including program instructions to implement various operations embodied by a computer. The media may also include, alone or in combination with the program instructions, data files, data structures, and the like. Examples of computer-readable media include magnetic media such as hard disks, floppy disks, and magnetic tape; optical media such as CD ROM disks and DVD; magneto-optical media such as optical disks; and hardware devices that are specially configured to store and perform program instructions, such as read-only memory (ROM), random access memory (RAM), flash memory, and the like. The media may also be a transmission medium such as optical or metallic lines, wave guides, and the like, including a carrier wave transmitting signals specifying the program instructions, data structures, and the like. Examples of program instructions include both machine code, such as produced by a compiler, and files containing higher level code that may be executed by the computer using an interpreter. The described hardware devices may be configured to act as one or more software modules in order to perform the operations of the above-described embodiments of the present invention.

Although a few embodiments of the present invention have been shown and described, the present invention is not limited to the described embodiments. Instead, it would be appreciated by those skilled in the art that changes may be made to these embodiments without departing from the principles and spirit of the invention, the scope of which is defined by the claims and their equivalents.

INDUSTRIAL APPLICABILITY

According to the present invention, a quality of an audio signal, transmitted to a user terminal, may be improved by increasing a probability of determining a frame of the audio signal as a speech interval in a speech codec via the communication network when transmitting the audio signal such as a substitute RBT to a user terminal via the communication network.

Also, according to the present invention, a substitute RBT having an enhanced sound quality may be provided by pre-processing an audio signal to not determine the audio signal as a speechless interval in a speech codec via a communication network when transmitting an audio signal such as the substitute RBT to a user terminal via the communication network.

The invention claimed is:

1. A method of pre-processing an audio signal transmitted to a user terminal via a communication network, the method comprising:
   receiving from a first user terminal a selection pre-determining an audio signal;
   receiving from a second user terminal a request for a call connection to the first user terminal and in response to the request:
      separating the audio signal into a plurality of channels;
      measuring a channel energy for each of the plurality of channels and selecting a specific channel energy from the measured channel energies;
      amplifying the specific channel energy to generate an amplified audio signal;
      encoding the amplified audio signal using a speech codec to generate an encoded audio signal, the speech codec configured to encode a speech signal; and
      transmitting the encoded audio signal to the second user terminal until the first user terminal answers the request for the call connection.

2. The method of claim 1, wherein the specific channel energy has a maximum value among channel energies of the plurality of channels.

3. The method of claim 1, wherein the encoding the amplified audio signal is accomplished by a predetermined codec module to be transmitted to the second user terminal, and encoding comprises:
   measuring a channel energy of each of the plurality of channels with respect to the audio signal, and estimating a background noise of each of the plurality of channels;
   estimating a signal to noise ratio (SNR) for each of the plurality of channels using the channel energy and the background noise; and
   encoding the audio signal based on the SNR.

4. The method of claim 3, wherein encoding further comprises:
   calculating a speech distance based on the SNR; and
   determining the audio signal as a speech signal when the speech distance is greater than a predetermined threshold value.

5. The method of claim 3, wherein the measuring the channel energy for each of the plurality of channels with respect to the audio signal, and the estimating the background noise for each of the plurality of channels comprises:
   comparing average values of the specific channel energy and the channel energy, among the measured channel energy, and determining the audio signal as a sinusoidal wave when the specific channel energy is greater than the average values.

6. The method of claim 3, wherein calculating a speech distance calculates the speech distance by summing up the SNRs of each of the plurality of channels.

7. The method of claim 3, wherein a threshold value measures a long term peak SNR based on the SNR of each of the plurality of channels, and determines the threshold value depending on the measured long term peak SNR.

8. The method of claim 3, wherein the codec module uses an AMR VAD option 2.

9. The method of claim 1, wherein the separating the audio signal into the plurality of channels separates the audio signal into the plurality of channels using a fast Fourier transform (FFT) algorithm.

10. A method of pre-processing an audio signal transmitted to a user terminal via a communication network, the method comprising:
    receiving from a first user terminal a selection pre-determining an audio signal;
    receiving from a second user terminal a request for a call connection to the first user terminal and in response to the request:
       separating the audio signal into a plurality of channels;
       measuring a channel energy of each of the plurality of channels, and selecting a specific channel energy from the measured channel energies;
       decreasing the channel energy of at least one channel except a channel having the specific channel energy to generate an amplified audio signal;
       encoding the amplified audio signal using a speech codec to generate an encoded audio signal, the speech codec configured to encode a speech signal; and
       transmitting the encoded audio signal to the second user terminal until the first user terminal answers the request for the call connection.

11. The method of claim 10, wherein the specific channel energy has a maximum value among channel energies of the plurality of channels.

12. The method of claim 10, wherein the encoding the amplified audio signal is accomplished by a predetermined codec module to be transmitted to the user terminal, and encoding comprises
    measuring a channel energy of each of the plurality of channels with respect to the audio signal, and estimating a background noise of each of the plurality of channels;
    estimating a signal to noise ratio (SNR) for each of the plurality of channels using the channel energy and the background noise; and
    encoding the audio signal based on the SNR.

13. The method of claim 12, wherein encoding further comprises:
    calculating a speech distance based on the SNR; and
    determining the audio signal as a speech signal when the speech distance is greater than a predetermined threshold value.

14. The method of claim 12, wherein the measuring the channel energy for each of the plurality of channels with respect to the audio signal, and the estimating the background noise for each of the plurality of channels comprises:

comparing average values of the specific channel energy and the channel energy, among the measured channel energy, and determining the audio signal as a sinusoidal wave when the specific channel energy is greater than the average values.

15. The method of claim 12, wherein calculating a speech distance calculates the speech distance by summing up the SNRs of each of the plurality of channels.

16. The method of claim 12, wherein a threshold value measures a long term peak SNR based on the SNR of each of the plurality of channels, and determines the threshold value depending on the measured long term peak SNR.

17. The method of claim 12, wherein the codec module uses an AMR VAD option 2.

18. The method of claim 10, wherein the separating the audio signal into the plurality of channels separates the audio signal into the plurality of channels using a fast Fourier transform (FFT) algorithm.

19. An apparatus of pre-processing an audio signal transmitted to a user terminal via a communication network, the apparatus comprising:

a processor to receive from a first user terminal a selection pre-determining an audio signal and to receive from a second user terminal a request for a call connection to the first user terminal;

a channel separation module to, in response to the request, separate an audio signal into a plurality of channels;

a channel measurement module to measure a channel energy of each of the plurality of channels;

a channel energy amplification module to select a specific channel energy from the measured channel energies and to amplify the specific channel energy to produce an amplified audio signal; and an encoding module to encode the amplified audio signal to generate an encoded audio signal and transmit the encoded audio signal to the second user terminal until the first user terminal answers the request for the call connection, the encoding module configured to encode a speech signal.

20. The apparatus of claim 19, wherein the specific channel energy has a maximum value among the channel energies of the plurality of channels.

21. The apparatus of claim 19, wherein the specific channel energy has a maximum value from each channel energy of the plurality of channels, and wherein the channel energy amplification module comparatively amplifies the specific channel energy by decreasing a channel energy of at least one channel except a channel having the specific channel energy.

* * * * *